United States Patent
Palmer

[15] 3,660,165
[45] May 2, 1972

[54] ELECTRODES COMPRISING FLUORINATED PHOSPHONITRILE POLYMER AND FUEL CELL IN COMBINATION THEREWITH

[72] Inventor: Nigel I. Palmer, Port Washington, N.Y.
[73] Assignee: Leesona Corporation, Warwick, R.I.
[22] Filed: Apr. 22, 1970
[21] Appl. No.: 30,948

[52] U.S. Cl. .................................136/86 D, 136/120 FC
[51] Int. Cl. ...........................H01m 27/04, H01m 13/00
[58] Field of Search ...................136/120 FC, 86; 260/2 P; 23/357

[56] References Cited

UNITED STATES PATENTS

| | | | |
|---|---|---|---|
| 3,378,406 | 4/1968 | Rosansky | 136/120 FC |
| 3,328,205 | 6/1967 | Barber et al. | 136/86 D |
| 3,216,882 | 11/1965 | Feldt et al. | 136/86 R X |
| 3,515,688 | 6/1970 | Rose | 260/2 P |

OTHER PUBLICATIONS

C & E News Jan 13, 1969 pp 34 & 35

Primary Examiner—Winston A. Douglas
Assistant Examiner—M. J. Andrews
Attorney—Brufsky, Staas, Breiner and Halsey

[57] ABSTRACT

Lightweight electrodes for use in an electrochemical device are described. In one embodiment the lightweight electrodes comprise a catalyst layer including an admixture of catalyst and a fluorinated phosphonitrile polymer. In another embodiment the hydrophobic backing layer is a continuous film of fluorinated phosphonitrile polymer with a contiguous layer of catalyst thereon. The catalyst can also be admixed and bound with particles comprising the same fluorinated phosphonitrile polymer used as the backing layer, derivatives of the polymeric material or other hydrophobic polymers such as polytetrafluoroethylene. The electrode is adapted to be disposed in an electrochemical cell with the catalytic layer in contact with the cell electrolyte.

31 Claims, No Drawings

ELECTRODES COMPRISING FLUORINATED PHOSPHONITRILE POLYMER AND FUEL CELL IN COMBINATION THEREWITH

BACKGROUND OF THE INVENTION

1. Field of the Invention

This invention relates to electrochemical cells such as batteries, fuel cells and the like. More particularly, the invention relates to improved electrodes to be utilized with such electrochemical devices. The electrode is characterized as a lightweight electrode having low internal ohmic resistance comprising a catalyst and a fluorinated phosphonitrile polymer. A current collector is optionally placed in contact with the electrocatalyst.

2. Description of the Prior Art

In recent years the demand for lightweight and reliable power sources possessing higher energy densities has intensified for both military and civilian programs. To fill this need considerable time and effort has been expended on improving electrochemical power systems such as fuel cells and metal/air or metal/oxygen battery systems, particularly the zinc/air system which has been recognized for its high energy capacity, long life and reliability as exemplified in railway signaling devices and the like.

These systems have employed electrodes fabricated in various forms using catalyst and polymeric materials in combination with each other. Moos, for example, in U.S. Pat. No. 3,276,909, issued on Oct. 4, 1966 discloses fuel cell electrodes comprising hydrophobic or hydrophilic porous polymer sheets formed of cellophane, polyethylene, fluorinated hydrocarbons or the like upon which a catalyst layer is placed. Sandwich or composite structures are also revealed. Elmore et al., in U.S. Pat. No. 3,419,900, issued on Dec. 31, 1968 discloses fuel cell electrodes wherein the catalyst is treated with an aqueous dispersion of a hydrophobic polymer such as polytetrafluoroethylene and applied to a conducting foraminous element such as a metal screen. Rosansky, in U.S. Pat. No. 3,378,406, issued on Apr. 16, 1968 describes a rechargeable battery having a plurality of electrochemical cells wherein each cell comprises lightweight envelope type cathode electrodes formed from polytetrafluoroethylene and the like and coated with an electrocatalyst. All of the aforementioned patents are commonly assigned to the assignee of the present invention.

Although the advantages of using polytetrafluoroethylene for electrode members as related to hydrophobicity, gas permeability and chemical inertness is art recognized, under certain conditions problems can arise with its use which adversely affects cell performance. More particularly, polytetrafluoroethylene is chemically inert and therefore difficult to bond into a leak-tight structure. It also is noted for its tendency to "cold flow". This latter characteristic is especially disadvantageous where very thin films are employed to reduce internal cell resistance and to maximize air permeability. Where the thin polymer membrane is subjected to repeated compression and relaxation cycles during alternate discharge and recharge operations as described in U.S. Pat. No. 3,378,406, the shape of the air electrode must be maintained over the life of the battery. Excessive distortion of the membrane can cause anode interference and/or jamming when the anode is positioned in the cell or removed therefrom. The cathode membrane is also subjected to undesirable physical abrasion resulting in damage or rupture.

OBJECTS AND GENERAL DESCRIPTION OF THE INVENTION

Accordingly, it is a primary object of the present invention to provide an improved lightweight electrode which is economical in construction and resistant to chemical and physical stresses encountered in electrochemical devices such as fuel cells and batteries.

Another object of the present invention is to provide improved electrodes comprising fluorinated phosphonitrile polymers, copolymers, or derivatives thereof in combination with catalytic materials for employment in power generating devices.

Still another object of this invention is to provide an improved electrode having a uniform distribution of fluorinated phosphonitrile polymers and electrocatalyst.

Yet another object of the present invention is to provide an improved electrode for electrochemical cells where the aforesaid electrocatalyst and fluorinated phosphonitrile polymer combination is bonded to a hydrophobic membrane.

Still another object of this invention is to provide an electrode structure comprising a cast catalyst hydrophobic polymer membrane which can be laminated to a suitable substrate.

A further object of the present invention is to provide an improved electrode suitable for use in a metal/air battery.

These and other objects of the present invention will become more readily apparent from the following description and examples.

These and other objects of this invention are accomplished by utilizing hydrophobic materials known as fluorinated phosphonitrile polymers as a catalyst binder, a supporting membrane or in various other physical combinations known in the art.

For illustrative purposes, the improved electrodes of this invention will be described with particular emphasis being placed on its use as a cathode electrode in a metal/air electrochemical cell of the type described by Rosansky in U.S. Pat. No. 3,378,406. It should be understood, however, that by selecting appropriate catalysts known in the art the electrode can readily be employed in fuel cells as the oxidant or reductant electrode.

As stated earlier, one type of electrochemical device in which the new electrode may be utilized is a metal/air or metal/oxygen depolarized cell of the type where only the anode of the cell is chemically changed during operation of the cell. The terms "air cell", "air depolarized cell", "oxygen cell", and "oxygen depolarized cell" used herein are interchangeable and signify an electrochemical cell having a non-consumable cathode wherein an oxidant, such as air or oxygen, permeates the cathode and is catalytically ionized at the cathode-electrolyte interface thereby generating direct current. This type of electrochemical generating device requires a continual supply of air or oxygen to the cathode. As the oxygen molecules emerge at the inner catalytic layer, ionization of the molecules is promoted by the catalyst forming hydroxyl ions and thd at the same time yielding electrons to an external circuit. The ions transfer across the electrolyte space to the anode thereby completing the cathodic reaction. Where the anode is zinc and oxygen is the depolarizing agent, the overall cell electrochemical reaction during the discharge may be shown as follows:

$$Zn + \tfrac{1}{2} O_2 \rightarrow ZnO \qquad (1)$$

The overall reaction is obtained by adding the separate electrode reactions occurring during discharge which may be shown as follows:

At the cathode:

$$\tfrac{1}{2} O_2 + H_2O + 2e \rightarrow 2\,OH^- \qquad (2)$$

At the anode:

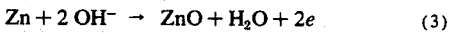
$$Zn + 2\,OH^- \rightarrow ZnO + H_2O + 2e \qquad (3)$$

It is noted that although the electrolyte takes no part in the overall cell reaction, hydroxyl ions are required to sustain the anodic reaction. It may, therefore, be necessary to ad water and/or electrolyte from time to time to make up for evaporative losses or the like.

As the cell discharges and current is drawn from the device, the active anodic zinc is completely or substantially completely oxidized. At this point, depending on the cell construction, the entire cell may be thrown away, in the case of a primary device; or where the cell is mechanically rechargeable, a new anode element is substituted for the consumed element; or where the cell is electrically rechargeable, the anode may be regenerated in situ using techniques well known in the art.

Whether the cell is constructed as a primary cell, a mechanically rechargeable cell, or an electrically rechargeable cell, the cathode of the present invention may be employed with any of these embodiments with substantially the same improved results.

Generally, the fluorinated phosphonitrile polymers useful in the present invention are those which are hydrolytically stable and possess a high degree of hydrophobicity. "Hydrophobicity", as the term is used herein connotes an ability to resist wetting or permeation by water, water-containing mixtures, and the like. Moreover, the fluorinated phosphonitrile polymer must be capable of withstanding chemical attack when subjected to the strong alkaline electrolytes normally employed in air depolarized cells and fuel cells. Advantageously, the polyer, copolymer or hybrid polymers are capable of resisting cold flow and permanent deformation under physical stress.

Although there are numerous combinations of polymers comprising halogenated phosphonitrile polymers including cyclic, linear, and condensed polymers which can range in degree of polymerization anywhere from a cyclic trimer to "rubbers" having a degree of polymerization on the order of about 100,000 or more, those comprising the higher molecular weights are preferred. Such polymers may be the product of an addition reaction between one or more of the various phosphonitrilic halide monomers, or between the phosphonitrilic halide and other reactive substances, such as isocyanates, and the like. Condensation polymers are also contemplated between molecules of the same substance or between the phosphonitrilic halides and polyfunctional amines, alcohols, and nucleophilic substance including alkoxides, aryloxides, and the like.

Structurally, the phosphonitrile polymer may be represented as:

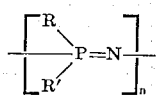

wherein $n$ is a whole number of at least 3 and advantageously from $10^3$ to $10^6$; R is a fluorine radical or fluorinated alkyl having from one to about 10 carbon atoms or a mono nuclear aryl radical such as a phenyl radical or mixtures thereof with or without substituted amino or thio containing radicals, or fluorinated alkoxy or aryloxy radicals; R' is the same as R or may be a halogen or a halogenated derivative such as chlorinated or brominated alkyl, alkoxy, aryl, aryloxy groups.

Typically, fluorinated phosphonitrile polymers which can be used are:

[NPF$_2$]$_n$           [NP(C$_6$F$_5$)$_2$]$_n$
[NP(F)(CF$_3$)]$_n$     [NP(OCH$_2$CF$_3$)$_{2n}$
[NP(CF$_3$)$_2$]$_n$    [NP(OCH$_2$C$_3$F$_7$)$_2$]$_n$
[NP(C$_2$F$_5$)$_2$]$_n$  [NP(OCH$_2$CF$_3$)  (OCH$_2$C$_3$F$_7$)]$_n$

It will be understood that the polymers of the present invention can be homopolymers, copolymers or hybrid polymers wherein one or more fluorine containing monomer units are combined. Especially preferred are the phophonitrile polymers comprising fluorinated alkoxy side groups having from one to about 11 carbon atoms per monomer unit. Exemplary of such species are the copolymers comprising trifluorethoxy and heptafluorobutoxy side groups in approximately equal numbers. Polymeric films made from this copolymer are especially useful as backing membranes in electrochemical cell electrodes of the present invention.

Various methods for making the aforementioned fluorine containing phosphonitrilic homopolymers, copolymers or the like have been described in the literature. One such technique is disclosed in "Phosphorus-Nitrogen Polymers" by N. L. Paddock, Chapter 4, in Developments in Inorganic Polymer Chemistry, Lapper and Leigh, Editors, Elsevier, N. Y. 1962, where it is stated that linear or cyclic phosphonitrilic halides may be obtained by the ammonolysis of phosphorus pentahalide. Where substituted phosphorus compounds, e.g., methyl, phenyl and the like, are employed as reactants, the products comprise methyl, phenyl, and the like, phosphonitrilic derivatives. Where the starting material is wholly chlorinated, fluorine substitution may be obtained using KSO$_2$F.

One especially advantageous copolymer or hybrid polymer comprising three distinct monomer units [NP(OCH$_2$CF$_3$)$_2$], [NP(OCH$_2$CF$_7$)$_2$], and [NP(OCH$_2$CF$_3$)(OCH$_2$C$_3$F$_7$)] may be made by following the teachings outlined in the Journal of Polymer Science, B, Vol. 6, pgs. 837, 838 (1968). In this process, commercially available phosphonitrilic chloride trimer is readily polymerized at 250° C. and thereafter reacted with suitable quantities of sodium trifluorethoxide and sodium heptafluorobutoxide, to yield the aforementioned copolymer with the last monomer unit being present in the largest proportion.

The aforementioned hybrid polymer have excellent thermal properties up to about 400° C. It has a glass transition temperature of $-77°$ C. making it suitable for use at extremely low temperatures and an initial decomposition point of about 300° C. in air on a thermobalance at a heating rate of 2.5° C. per minute. The material does not burn but softens and vaporizes when subjected to a direct flame. It is resistant to degradation when immersed for prolonged periods in boiling water, solvents such as alcohols, ketones and aldehydes and concentrated acids and alkalis. It is soluble, however, in trichlorotrifluoroethane and has an intrinsic viscosity at 30° C. of 1.46 deciliters per gram in an 89:11 trichlorotrifluoroethane/acetone mixture.

In general, the fluorinated phosphonitrile polymers which are most desirable in the preparation of electrode structure are those having molecular weights between about 50,000 to 1,000,000 although this range is not critical. What is important is its high degree of hydrophobicity, and its film forming and bonding characteristics.

The improved electrode structure of the present invention can be fabricated in any number of ways:

1. true or colloidal solutions are employed as the suspending medium for electrocatalyst particles and the resultant suspension applied to metal support screens by spraying, slip-casting, brushing, rolling or the like and bonded thereto by heating with or without pressure. Alternatively, non-colloidal polymer particles can be admixed with catalyst particles as a slurry or dry mixed and applied to the screen. Normally the heat treatment will be from about 25° C. up to about 300° C. If desired, the support screen can be deleted:

2. applying the fluorinated phosphonitrile polymer electrocatalyst suspension directly to an electrolyte matrix such as an ion exchange resin membrane, membranes of polyvinylalcohol, cellulose, polyacrylonitrile, polytetrafluoroethylene polymer asbestos, polyethylene or the like. The matrix can be formed from gelled, foamed, powdered or fibrous species of such materials provided the material has interstices which permit absorption of the aqueous electrolyte solution by capillary forces. If the matrix is formed of fiber, the fibers may be in the form of woven cloth or unwoven matting or felts;

3. applying a fluorinated phosphonitrile polymer/electrocatalyst suspension directly to a hydrophobic membrane such as membranes of the fluorinated hydrocarbons including polytetrafluoroethylene, polytrifluorochloroethylene, polyvinylidenefluoride, and the like. The structure is disposed of in an electrochemical cell in order that the polymer membrane is in contact with the reactant of the cell and the fluorinated phosphonitrile polymer/catalyst admixture in contact with the electrolyte;

4. as only a partial replacement for the fluorinated hydrocarbon in electrodes constructed according to (1) – (3) above and as a means for bonding the fluorinated hydrocarbon and electrocatalyst together;

5. to coat one surface of a unitary electrocatalyst structure to provide a hydrophobic gas permeable and liquid impermeable film on the electrode structure. This structure would be disposed of in an electrochemical cell in order that the fluorinated phosphonitrile polymer film is in contact with the reactant and the electrocatalyst in contact with the electrolyte of the cell;

6. casting thin gas permeable films of the fluorinated phosphonitrile polymer and applying a catalytic material to the cast film or casting films of an electrocatalyst fluorinated phosphonitrile polymer suspension and laminating the so cast film to gas permeable but liquid impermeable films such as fibrous or calendered polytetrafluoroethylene and/or fluorinated phosphonitrile polymer films;

7. casting a plurality of electrocatalyst/fluroinated phosphonitrile polymer with the electrocatalyst being present in various ratios and laminating the resultant films together in the order of the increased ratio of electrocatalyst to provide an electrode structure having a graded hydrophobicity. The structure would be disposed of in an electrochemical cell in order that the surface having the greater amount of electrocatalyst is in contact with the electrolyte and the surface having the lower amount of electrocatalyst in contact with the reactant;

8. casting a film upon a current collector to provide a hydrophobic film and current collector as an integral structure and applying the electrocatalyst to the conductive surface of the structure;

9. spraying a solvent solution of the fluorinated phosphonitrile polymer to an existing polytetrafluoroethylene highly porous film such as Zitex, a product of Chemplast Corporation, of East Newark, N. J., in order to reduce the porosity of the film and utilizing the resultant structure in an electrode according to (2), (3), (4), and (7) above or laminating the structure to a polytetrafluoroethylene substrate;

10. providing relatively low-polymer content containing hydrophobic films by applying a true or colloidal solution of the fluorinated phosphonitrile polymer to one surface of a porous hydrophilic material such as Kraft paper, filter paper or the like and utilizing the resultant structure in (2), (3), (4), and (7) above.

Based on the aforesaid, an electrode structure according to the present invention can be tailored to meet the specific requirement of an electrochemical cell utilizing at least one non-consumable electrode such as a fuel cell system or an air depolarized cell. Thus, by proper modification of the aforesaid embodiments electrodes can be obtained having varying degrees of hydrophobicity and gas and liquid impermeability.

Where the electrode comprises a hydrophobic backing layer and a contiguous layer of catalyst the thickness of the polymer membrane and/or the catalytic layer thereon is not critical. It is only essential that the polymer membrane be sufficiently thick to withstand the pressure and ancillary conditions of the electrochemical device in which it is employed and be sufficiently thin to minimize diffusion restrictions for reactants flow to the catalyst. Such films may be fabricated by techniques well known in the art. Where the membrane is a continuous film of fluorinated phosphonitrile hybrid polymer it is made by first dissolving the hybrid polymer in trichlorotrifluoroethane with or without acetone present and thereafter spraying or casting a thin film on a removably positioned surface until the requisite thickness is attained. The resulting film is then dried and/or prepared for further processing. The catalytic layer can be relatively thick, but preferably is as thin as possible, from the standpoint of economy and to maximize gas permeation therethrough. The ability to construct the composite cathode as an exceptionally thin unit contributes to the high energy to weight and energy to volume ratio obtained with the cells. Preferably, the hydrophobic polymer membrane will have a thickness of from about 0.5 to 10 mils, with the optimum range being 2 to 5 mils. The catalytic layer is kept as thin as possible for purposes of economy and is preferably from about 0.2 to 8 mils in thickness, with the optimum range being from 0.5 to 2 mils.

The catalyst layer is preferably applied on the inner surface of the hydrophobic membrane by any of the suitable methods known in the art and provides the requisite reactant-electrolyte reaction interface. The catalyst used to coat the hydrophobic polymers, or used in admixture therewith, are the pure elements, alloys, oxides, or mixtures thereof which are effective in promoting an electrochemical reaction with oxygen. More specifically, operable materials include the elements belonging to groups IB, IIB, IV, V, VI, VII, and VIII of the Mendlyeev's periodic table, as well as alloys, oxides, and mixtures of such elements. For example, suitable catalysts include the noble metals such as platinum, palladium, gold, silver and the like.

Alternatively, particles of fluorinated phosphonitrile polymer may be dispersed with the catalyst and the mixture applied to an underlying support membrane and secured thereto. An admixture of catalytic metal and the aforesaid polymer can be formed as a substantially uniform water dispersion or emulsion of platinum black, for example, and polymer particles in proportions sufficient to allow rapid and even distribution over the underlying substrate. Thereafter, the water is removed by heating and the admixed particles are bound to each other and to the substrate. The ratio of polymer to catalytic metal in the dispersion is not critical. From the standpoint of economics, as little metal catalyst should be used as is capable of sustaining the necessary catalysis and getting sufficient conductivity. Generally, the metal content will range from about 10 percent to about 95 percent by weight, from about 40 to 80 percent being preferred and about 75 percent being most preferred.

A current collector may be optionally employed in adjacent contiguous relationship with the catalyst or catalyst-polymer admixture. The current collector may be of any suitable material capable of conducting an electrical current and able to withstand the corrosive environment of the battery. In practice, a thin, flexible, open type structure is provided formed of expanded metal, nickel, silver, zirconium, titanium and tungsten, or the like. Desirably, the current collector is pressed into intimate contact with the catalyst or catalyst-polymer admixture.

The anodes which are to be used with the envelope cathode of the present invention can be any contentional solid electroconductor employed in a metal/air or metal/oxygen cell such as metals, metalloids, alloys, and the heavy metal salts. It is only essential that the material selected be chemically reactive with a compatible electrolyte and be more electro-positive than oxygen. Such materials include lead, zinc, iron, cadmium, aluminum and magnesium. From the standpoint of cost, capacity, and convenience, zinc is the preferred material. Although the anode can be in the form of a solid, or substantially solid metal sheet, it is preferred that the anode be porous. Porous anodes can be made, for example, by sintering select metal powders.

The cells will operate on conventional electrolytes, including the alkaline materials such as sodium hydroxide, potassium hydroxide, mixtures of potassium and rubidium hydroxide and the like. Acid electrolytes including sulphuric acid, phospheric acid and hydrochloric acid can be employed. As is apparent, depending upon the particular electrolyte used, different anode materials can be selected. It is also feasible, and at times desirable, to employ an electrolyte which is trapped in a suitable matrix such as those made up of hydrophile polymers, ceramic materials, and the like.

Having described the invention in general terms, the following examples are set forth to more fully illustrate the preferred embodiments of the invention. These examples, however, are not meant to be limiting. Parts are by weight unless indicated otherwise.

EXAMPLE 1

An electrode is constructed as an envelope cathode member including a 5 mil thick hydrophobic trifluoroethoxyheptafluorobutoxy phosphonitrile hybrid polymer membrane comprising recurring monomer units of [NP(OCH$_2$CF$_3$)$_2$], [NP(OCH$_2$CF$_7$)$_2$] and [NP(OCH$_2$CF$_3$)(OCH$_2$C$_3$F$_7$)]. The membrane is coated on one surface with a thin layer of platinum black approximately 0.8 micron thick. A platinum loading of approximately 7 mgs. per cm$^2$ on the cathode surface results. A conductive 300 Tyler mesh silver screen is pressed into the catalyst to act as a current collector and support the thin membrane. The composite structure is heated in an oven at about 150° C. to drying.

The resulting cathode is employed in a mechanically rechargeable metal/air cell of the type described by Rosansky, aforementioned, comprising an 80 percent porous zinc anode and a metal hydroxide electrolyte. The anode is wrapped with a cellulosic material such as Visking and impregnated with 30 percent aqueous potassium hydroxide. After insertion in the envelope, the unit is sealed to provide a fluid-tight cell.

The cell is electrically connected to an external load and current is drawn continuously until the anode is substantially discharged whereupon a new anode is substituted and the cycle repeated. The thus assembled cell provides an open-cell voltage of about 1.45 volts and peak discharge density of 160 mA/cm$^2$. Furthermore, the energy/density value is exceptional, i.e., about 50–60 W-hr/lb. After repeated anode replacements, the cathode remains in excellent condition with no apparent distortion or rupture.

EXAMPLE 2

An electrode is fabricated by forming a paste of platinum black powder with the hybrid fluorinated phosphonitrile polymer of Example 1. The solvent is trichlorotrifluoroethane/acetone mixture. The resultant catalyst paste is applied to a 7 mil unsintered polytetrafluoroethylene film supplied by W. S. Shamban & Co., Culver City, Calif. by rolling. A platinum loading of approximately 5 g/cm$^2$ resulted. A 300 mesh, Tyler scale, nickel screen current collector was impressed into the catalyst/polymer layer. The thus formed electrode, tested as an envelope cathode in a manner substantially identical to Example 1, gives similar results.

Additionally, in the foregoing examples the polymer membrane can be fabricated with any of the following fluorinated phosphonitrile polymers:

[NPF$_2$a]$_n$        [NP(C$_6$F$_5$)$_2$]$_n$
[NP(F)(CF$_3$)]$_n$    [NP(OCH$_2$CF$_3$)$_2$n$
[NP(CF$_3$)$_2$]$_n$   [NP(OCH$_2$C$_3$ F$_7$)$_2$]$_n$
[NP(C$_2$F$_5$)$_2$]$_n$  [NP(OCH$_2$CF$_3$)  (OCH$_2$C$_3$F$_7$)]$_n$ wherein $n$ is a whole number of at least 3. The rubbers having a molecular weight of at least about 100,000 are especially useful. The proper selection of a suitable material is within the ability of a skilled artisan.

It will be understood that the new electrodes of the present invention can be utilized in electrochemical devices generally operated over a wide range of temperatures. The fluorinated phosphonitrile elastomers are capable of withstanding low temperatures on the order of −70° C. without becoming brittle. However, since battery efficiency is considerably improved where the operating temperature is from about room temperature to about 350° C., the latter range is more desirable. Preferably, the operating temperature should be in the neighborhood of between 20° to 100° C.

Additionally, the present electrodes can be employed as either the anode or cathode of a fuel cell. By judiciously selecting the activating metal of the catalytic layer, the electrodes of the present invention can be tailored to be particularly suitable for any specific fuel, including hydrogen, carbon monoxide, methane, methanol, propane and kerosene vapors. Metals such as silver and gold are also excellent cathodic metals when the cell is operated using air as the oxidant.

It should be appreciated that the present invention is not to be construed as being limited by the illustrative embodiments. It is possible to produce still other embodiments without departing from the inventive concept herein disclosed. Such embodiments are within the ability of one skilled in the art.

IT IS CLAIMED:

1. An electrochemical cell comprising an anode, a cathode and an electrolyte between said anode and cathode at least one of said anode and cathode comprising an electrocatalyst and a fluorinated phosphonitrile polymer.

2. The electrochemical cell of claim 1 wherein the electrocatalyst and the fluorinated phosphonitrile polymer are in intimate admixture.

3. The electrochemical cell of claim 1 wherein the fluorinated phosphonitrile is a hydrophobic membrane and the electrocatalyst is in intimate contact with said membrane.

4. The electrochemical cell of claim 1 including a hydrophobic membrane for supporting an intimate admixture of said electrocatalyst and fluorinated phosphonitrile polymer.

5. The electrochemical cell of claim 4 wherein said hydrophobic membrane is polytetrafluoroethylene.

6. The electrochemical cell of claim 4 wherein said hydrophobic membrane is a fluorinated phosphonitrile polymer.

7. The electrochemical cell of claim 1 wherein the electrochemical cell is a metal/air depolarized cell.

8. The electrochemical cell of claim 7 wherein the electrocatalyst comprises a metal taken from the group consisting of elements of groups VIII and IB of the periodic table and mixtures and alloys thereof.

9. The electrochemical cell of claim 7 wherein the anode is a porous metal.

10. The electrochemical cell of claim 1 wherein the electrolyte comprises alkali metal hydroxide.

11. The electrochemical cell of claim 2 wherein the admixture of electrocatalyst and fluorinated phosphonitrile polymer are formed in a unitary coherent structure.

12. The electrochemical cell of claim 1 wherein the fluorinated phosphonitrile polymer membrane has a formula:

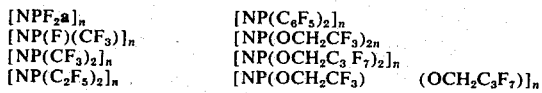

wherein $n$ is a whole number of at least 3; R is selected from the group of radicals consisting of fluorine, fluorinated alkyls having from one to about 10 carbon atoms, fluorinated mononuclear aryls, amino or thio containing derivatives, fluorinated alkoxy, fluorinated aryloxy and mixtures thereof; R' is the same as R or may be a halogen or a halogenated derivative taken from alkyl, alkoxy, aryl, aryloxy groups.

13. The electrical cell of claim 12 wherein the fluorinated phosphonitrile polymer comprises recurring monomer units having the formula:

[NP(OCH$_2$R'')$_2$] and R'' is a fluorinated hydrocarbon.

14. The electrochemical cell of claim 12 wherein the fluorinated phosphonitrile polymer is a copolymer comprising trifluoroethyoxy-heptafluorobutoxy side groups.

15. The electrochemical cell of claim 1 including a current collector contacting said electrocatalyst.

16. The electrochemical cell of claim 3 wherein said electrocatalyst is in intimate admixture with particles of a fluorinated hydrocarbon.

17. An improved electrode adapted to be used in an electrochemical device for the generation of electricity comprising a fluorinated phosphonitrile polymer and electrocatalyst.

18. The electrode of claim 17 including a hydrophobic membrane coated with an admixture of said electrocatalyst and fluorinated phosphonitrile polymer.

19. The electrode of claim 18 wherein the hydrophobic membrane is polytetrafluoroethylene.

20. The electrode of claim 18 wherein the hydrophobic membrane is a fluorinated phosphonitrile polymer.

21. The electrode of claim 17 characterized as an air cathode for use in metal/air depolarized electrochemical cells.

22. The electrode of claim 17 wherein the electrocatalyst and fluorinated phosphonitrile polymer are intimately admixed and formed into unitary coherent structure.

23. The electrode of claim 17 characterized as a composite electrode wherein the backing layer comprises fluorinated phosphonitrile polymer and electrocatalyst is secured thereto.

24. The electrode of claim 17 wherein the electrocatalyst comprises a metal taken from group VIII and IB of the periodic table and mixture and alloys thereof.

25. The electrode of claim 17 wherein the fluorinated phosphonitrile polymer has a formula:

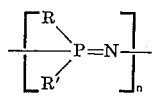

wherein $n$ is a whole number of at least 3; R is selected from the group of radicals consisting of fluorine, fluorinated alkyls having from one to about 10 carbon atoms, fluorinated mononuclear aryls, amino or thio containing derivatives, fluorinated alkoxy, fluorinated aryloxy and mixtures thereof; R' is the same as R or may be halogen or a halogenated derivative taken from alkyl, alkoxy, aryl, aryloxy groups 26. The electrode of claim 17 wherein the fluorinated phosphonitrile polymer comprises recurring monomer units having the formula:

$$[NP(OCH_2R'')_2]$$

wherein R'' is a fluorinated hydrocarbon.

27. The electrode of claim 17 wherein the fluorinated phosphonitrile polymer is a copolymer comprising trifluorethoxy-heptafluorobutoxy side groups.

28. The electrode of claim 17 wherein the electrode is an air cathode and the supporting polymeric film comprising at least three recurring monomer units taken from the group consisting of $[NP(OCH_2CF_3)_2]$, $[NP(OCH_2C_3F_7)_2]$ and $[NP(OCH_2CFC3)(OCH_2C_3F_7)]$ and combinations thereof.

29. The electrode of claim 17 wherein said electrocatalyst is admixed with particles of fluorinated phosphonitrile polymer.

30. The electrode of claim 17 including a current collector contacting said electrocatalyst.

31. The electrode of claim 23 wherein the electrocatalyst is intimately admixed with a fluorinated hydrocarbon.

* * * * *